US011097774B2

(12) United States Patent
Nishida et al.

(10) Patent No.: US 11,097,774 B2
(45) Date of Patent: Aug. 24, 2021

(54) STEERING ASSIST SYSTEM

(71) Applicant: Toyota Jidosha Kabushiki Kaisha, Toyota (JP)

(72) Inventors: Takeshi Nishida, Nagoya (JP); Shuji Fujita, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 16/272,365

(22) Filed: Feb. 11, 2019

(65) Prior Publication Data

US 2019/0248410 A1 Aug. 15, 2019

(30) Foreign Application Priority Data

Feb. 12, 2018 (JP) .............................. JP2018-022646

(51) Int. Cl.
*B62D 5/06* (2006.01)
*B62D 5/065* (2006.01)
*B62D 5/09* (2006.01)
*B62D 5/18* (2006.01)
*B62D 5/10* (2006.01)
*B62D 5/20* (2006.01)

(52) U.S. Cl.
CPC ............. *B62D 5/064* (2013.01); *B62D 5/065* (2013.01); *B62D 5/09* (2013.01); *B62D 5/10* (2013.01); *B62D 5/18* (2013.01); *B62D 5/20* (2013.01)

(58) Field of Classification Search
CPC .......... B62D 5/064; B62D 5/065; B62D 5/09; B62D 5/10; B62D 5/18; B62D 5/20; B62D 5/30; B62D 5/32

USPC ......................................................... 180/422
See application file for complete search history.

(56) References Cited

U.S. PATENT DOCUMENTS

2013/0175111 A1* 7/2013 Blond ................... B62D 5/065
180/423

FOREIGN PATENT DOCUMENTS

| CN | 103448792 A | 12/2013 |
|----|-------------|---------|
| JP | H068840 A | 1/1994 |
| JP | H8301132 A | 11/1996 |
| JP | 3218788 B2 | 10/2001 |
| JP | 2014-019290 A | 2/2014 |

* cited by examiner

*Primary Examiner* — Minnah L Seoh
*Assistant Examiner* — Sophia Marie McGuire
(74) *Attorney, Agent, or Firm* — Dinsmore & Shohl LLP

(57) ABSTRACT

A steering assist system for a hybrid vehicle capable of being driven by both of an engine and a drive motor, including a first assist portion and a second assist portion configured to assist a steering force respectively utilizing the engine and an electric motor each as a drive source, wherein the steering force is assisted only by the second assist portion in a motor-driven state in which the vehicle is driven only by the drive motor, and wherein the steering assist system is configured to, upon occurrence of a failure of the second assist portion in the motor-driven state, drive the engine, execute assist switching from an assist by the second assist portion to an assist by the first assist portion, and gradually increase, in the assist switching, an assist force by the first assist portion up to a set assist force when the vehicle is being steered.

11 Claims, 7 Drawing Sheets

STEERING ASSIST SYSTEM

CROSS REFERENCE TO RELATED APPLICATION

The present application claims priority from Japanese Patent Application No. 2018-022646, which was filed on Feb. 12, 2018, the disclosure of which is herein incorporated by reference in its entirety.

BACKGROUND

Technical Field

The following disclosure relates to a steering assist system configured to be installed on a vehicle and to assist steering of wheels of the vehicle.

Description of Related Art

Hybrid vehicles configured to be capable of being driven by both of an engine and a drive motor have recently become popular, and there has been proposed a steering assist system for assisting a steering force generated by an operation of a steering operation member performed by a driver, as disclosed in Japanese Patent Application Publication No. 2014-19290, for instance. The disclosed system includes a first assist portion configured to assist the steering force utilizing the engine as a drive source and a second assist portion configured to assist the steering force utilizing the drive motor (electric motor) as a drive source. (The system will be hereinafter referred to as "two-drive-source steering assist system" where appropriate). In a motor-driven state in which the vehicle is driven only by the drive motor, the engine is not operating. Thus, in the two-drive-source steering assist system, the steering force is assisted only by the second assist portion in the motor-driven state. The motor-driven state will be hereinafter referred to as "state in which the vehicle is running in an EV mode" where appropriate.

SUMMARY

In the case where the second assist portion of the two-drive-source steering assist system fails to operate, the engine may be started to switch from an assist by the second assist portion to an assist by the first assist portion. In the case where the assist switching is not properly executed, however, it is expected that the driver will suffer from an influence of a change in the assist force via the steering operation member. Accordingly, the present disclosure is directed to a two-drive-source steering assist system configured to execute assist switching of the steering force from an assist that depends on an operation of the electric motor to an assist that depends on an operation of the engine.

In one aspect of the disclosure, a steering assist system is the two-drive-source steering assist system configured to, when a failure of the second assist portion occurs in the EV mode, drive the engine and execute switch assisting from the assist by the second assist portion to the assist by the first assist portion. Further, in the case where the vehicle is being steered, the assist force by the first assist portion is gradually increased in the assist switching.

In the case where the vehicle is being steered, the steering assist system constructed as described above avoids the assist force from being abruptly generated by the first assist portion when the engine operates after the assist force by the second assist portion becomes zero. Thus, the steering system prevents or reduces a change in the assist force with respect to the steering operation by the driver. That is, the steering assist system enables proper switching from the assist force by the second assist portion to the assist force by the first assist portion.

There will be exemplified and explained various forms of aspects of the present disclosure. Each of the forms is numbered like the appended claims and depends from the other form or forms, where appropriate. This is for easier understanding of the aspects of the present disclosure. That is, it is to be understood that the aspects of the present disclosure shall be construed in the light of the following description of various forms and embodiments. It is to be further understood that, as long as the aspects of the present disclosure is construed in this way, any form in which one or more constituent elements is/are added to or deleted from any one of the following forms may be considered as one form of the aspects of the present disclosure.

(1) A steering assist system for a hybrid vehicle configured to be capable of being driven by both of an engine and a drive motor, including:

a first assist portion configured to assist a steering force utilizing the engine as a drive source, and a second assist portion configured to assist the steering force utilizing an electric motor as a drive source, wherein the steering force is assisted only by the second assist portion in a motor-driven state in which the vehicle is driven only by the drive motor, and wherein the steering assist system is configured to, when a failure of the second assist portion occurs in the motor-driven state, drive the engine, execute assist switching from an assist by the second assist portion to an assist by the first assist portion, and gradually increase, in the assist switching, an assist force generated by the first assist portion up to a set assist force in a case where the vehicle is being steered.

When the steering force is just lost in the case where the vehicle is being steered, in other words, when the steering force is just lost in the case where the driver is performing an operation of the steering operation member (hereinafter simply referred to as "steering operation" where appropriate), a steering amount of the vehicle temporarily decreases. The driver, however, senses a loss of a force by the assist (hereinafter referred to as "assist force" where appropriate) and unconsciously performs the steering operation to increase a force by which the steering operation member is operated. (The force will be hereinafter referred to as "steering operation force" where appropriate.) The driver relatively easily performs such a steering operation, in other words, the driver relatively easily responds to the loss of the assist force that occurs when the vehicle is being steered. In the case where the assist force is suddenly generated again in the midst of this steering operation to increase the steering operation force, however, the suddenly increased assist force abruptly assists the steering operation force that has been increased by the driver. In this case, it is expected that the driver undesirably suffers from an influence of the change in the assist force.

This form aims at addressing the problem described above. According to this form, when there occurs a failure in which the second assist portion does not work during running of the vehicle in the EV mode, the steering assist system executes the assist switching from the assist by the second assist portion to the assist by the first assist portion. In the assist switching, the assist force by the first assist portion is gradually increased in the case where the steering operation is being performed. According to this form, the assist force is gradually made larger when the assist force that has once become lost again generated, thus enabling the driver to easily maintain an appropriate steering amount.

As long as the first assist portion and the second assist portion of the steering assist system respectively include the engine and the electric motor, each as a drive source, the structure of each of the first assist portion and the second assist portion is not limited. (The steering assist system will be simply referred to as "assist system" where appropriate.) For instance, the assist system may employ a second assist portion in which the force of the electric motor acts directly as the assist force. As later explained, the assist system may be a hydraulic assist system including two pumps configured to be driven by the engine and the electric motor, respectively. In short, the second assist portion is required to have a function of assisting the steering force in the EV mode, in place of the first assist portion that does not work in the EV mode.

Although the magnitude of the set assist force in this form is not limited, the set assist force may have the same magnitude as the assist force generated before the second portion fails to operate, for instance. Owing to this set assist force, the assist force by the first assist portion is gradually increased after the occurrence of the failure of the second assist portion up to the assist force whose magnitude is equal to that of the assist force that has been generated by the second assist portion before the occurrence of the failure, thus preventing a change in the operation feeling felt by the driver in the steering operation before and after the occurrence of the failure of the second assist portion. It is desirable that the assist force by the first assist portion be gradually increased such that the assist force reaches the set assist force within about 0.5-5 seconds.

In the case where the assist system of this form is configured such that the assist force changes in accordance with the steering operation force of the driver, namely, in accordance with the steering force, the concept that the assist force by the first assist portion is gradually increased up to the set assist force may be construed as including a concept that the assist capability of the first assist portion is gradually increased up to a set assist capability. This may be applicable to the forms described below and will be later explained in detail taking a hydraulic assist system as an example.

(2) The steering assist system according to the form (1), wherein, in a case where the vehicle is not being steered, the assist force generated by the first assist portion is made equal to the set assist force from a time point of execution of the assist switching.

In the case where the vehicle is not being steered, the problem described above does not arise even if the second assist portion fails to operate in the EV mode. According to this form, the assist force by the first assist portion is immediately increased up to the set assist force, thus enabling a sufficient assist force to be obtained from an initial stage of the next steering operation.

(3) The steering assist system according to the form (1) or (2), wherein the set assist force is made equal to the assist force generated by the second assist portion before execution of the assist switching.

This form enjoys the advantage that the operation feeling felt by the driver in the steering operation does not change before and after the occurrence of the failure of the second assist portion.

(4) The steering assist system according to any one of the forms (1) through (3), further including:

a reservoir storing a working fluid;

an engine pump configured to be driven by the engine and to pump up the working fluid stored in the reservoir so as to eject the working fluid at a flow rate in accordance with a rotational speed of the engine;

a motor pump configured to be driven by the electric motor and to pump up the working fluid stored in the reservoir so as to eject the working fluid; and an assist device configured to receive the working fluid ejected from the motor pump and the working fluid ejected from the engine pump and to assist the steering force by the received working fluid while returning the received working fluid to the reservoir, wherein the first assist portion is constituted by the reservoir, the engine pump, and the assist device, and the second assist portion is constituted by the reservoir, the electric motor, the motor pump, and the assist device.

This form adds limitation as to the overall structure of the assist system and relates to what is called two-pump hydraulic steering assist system. In the engine pump of the assist system of this form, the ejection flow rate of the working fluid increases substantially linearly in accordance with an increase in a rotational speed of the engine. In a state in which the vehicle is capable of running by the engine (engine mode) and a state in which the vehicle is capable of running by both of the engine and the drive motor (hybrid mode), the engine rotates at a speed higher than or equal to a set idling speed, so that the engine pump ejects the working fluid at a flow rate higher than or equal to a set ejection flow rate. In the meantime, the engine is stopped in the EV mode, so that the working fluid is not ejected from the engine pump.

The assist device of this form may be configured to include (a) a hydraulic actuator configured to give, to a steering shaft, a steering rod, etc., of the steering system, a force to assist the steering force, i.e., an assist force, in accordance with the pressure of the working fluid that the actuator receives and (b) a supply-flow controlling mechanism configured to control the flow rate of the working fluid supplied to the actuator. An ordinary supply-flow controlling mechanism as illustrated in FIG. 2 of the Japanese Patent Application Publication No. 6-8840 may be employed, for instance. Specifically, there may be employed the supply-flow controlling mechanism configured to receive the working fluid ejected from at least one of the engine pump and the motor pump. In this supply-flow controlling mechanism, the working fluid is returned to the reservoir when the steering force is not being generated whereas a part of the received working fluid is supplied to the actuator at a flow rate in accordance with the steering when the steering force is being generated. For the assist device, the flow rate of the working fluid to be received by the assist device, namely, to be received by the supply-flow controlling mechanism, is set as the required receiving flow rate so as to generate an appropriate assist force.

In this form, the failure of the second assist portion means a failure that renders the motor pump inoperative. Specifically, the failure of the second assist portion includes a failure of the motor pump itself and a failure of the electric motor that drives the motor pump, for instance.

In the case where the two-pump hydraulic steering assist system is employed, the level of the flow rate of the working fluid that is received by the assist device from at least one of the engine pump and the motor pump may be regarded as the assist capability of the assist system. In this form, therefore, the engine-pump ejection flow rate, which is a flow rate of the working fluid ejected from the engine pump to the assist device, may be regarded as the assist capability of the first assist portion. Similarly, the motor-pump ejection flow rate, which is a flow rate of the working fluid ejected from the motor pump to the assist device, may be regarded as the assist capability of the second assist portion. This form is configured such that, when the failure of the second assist portion occurs in the EV mode, the motor-pump ejection flow rate that has been established is replaced with the engine-pump ejection flow rate as the set flow rate, i.e., the set assist capability. In the thus configured assist system, the switching from the assist force by the second assist portion to the assist force by the first assist portion is effectuated as replacement of the assist capability of the second assist portion with the assist capability of the first assist portion. Thus, when the failure of the second assist portion occurs in the EV mode, the engine-pump ejection flow rate is gradually increased in the case where the vehicle is being steered. In this instance, the replacement of the assist capability is executed such that the assist capability of the first assist portion after the occurrence of the failure is the same as the assist capability of the second assist portion before the occurrence of the failure, namely, such that the engine-pump ejection flow rate after the occurrence of the failure is the same as the motor-pump ejection flow rate before the occurrence of the failure.

(5) The steering assist system according to the form (4), further including: an engine-pump ejection flow rate controller configured to control an engine-pump ejection flow rate which is a flow rate of the working fluid ejected from the engine pump; and a motor-pump ejection flow rate controller configured to control, by controlling an operation of the electric motor, a motor-pump ejection flow rate which is a flow rate of the working fluid ejected from the motor pump, wherein, in the assist switching executed when the vehicle is being steered, the engine-pump ejection flow rate controller gradually increases the engine-pump ejection flow rate up to a set flow rate such that the assist force is gradually increased.

The engine-pump ejection flow rate controller according to this form may employ an electromagnetic valve mechanism having a known ordinary structure as illustrated in FIG. 2 of the Japanese Patent Application Publication No. 2014-19290, for instance. The engine-pump ejection flow rate controller is configured to control an electric current supplied to a solenoid so as to permit the working fluid to pass therethrough at a flow rate in accordance with the controlled electric current. Owing to provision of the engine-pump ejection flow rate controller, this form offers an advantage of preventing a rapid change in the flow rate of the working fluid ejected to the assist device when the running mode of the vehicle is switched from the EV mode to a mode in which the vehicle runs by driving of the engine (hereinafter referred to as "engine mode" where appropriate) or to a mode in which the vehicle runs by driving of both of the drive motor and the engine (hereinafter referred to as "hybrid mode" where appropriate). Further, in the engine mode and the hybrid mode, the engine-pump ejection flow rate controller may control the engine pump to eject the working fluid at the engine-pump ejection flow rate lower than the required receiving flow rate, and an insufficient flow rate, which is a shortage in the required receiving flow rate and which cannot be covered by the engine-pump ejection flow rate, may be covered by the motor-pump ejection flow rate. The thus configured assist system ensures sufficient assist capability while achieving downsizing of the engine pump. The motor-pump ejection flow rate controller in this form may be constituted as an electronic controller including a computer and drive circuits for the electric motor.

(6) The steering assist system according to the form (5), wherein the engine-pump ejection flow rate controller gradually increases the engine-pump ejection flow rate, in the assist switching executed when the vehicle is being steered, such that a flow-rate increase gradient is constant.

In this form, the gradient at which the assist force is gradually increased in the assist switching is made constant. This form enables relatively smooth assist switching in a relatively simple manner.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

A steering assist system according to one embodiment of the present disclosure will now be explained in detail with, reference to the drawings. It is to be understood that the disclosure is not limited to the details of the following embodiment but may be changed and modified based on the knowledge of those skilled in the art.

[A] Structure of Vehicle on Which Steering Assist System is Installed

Figure 1:
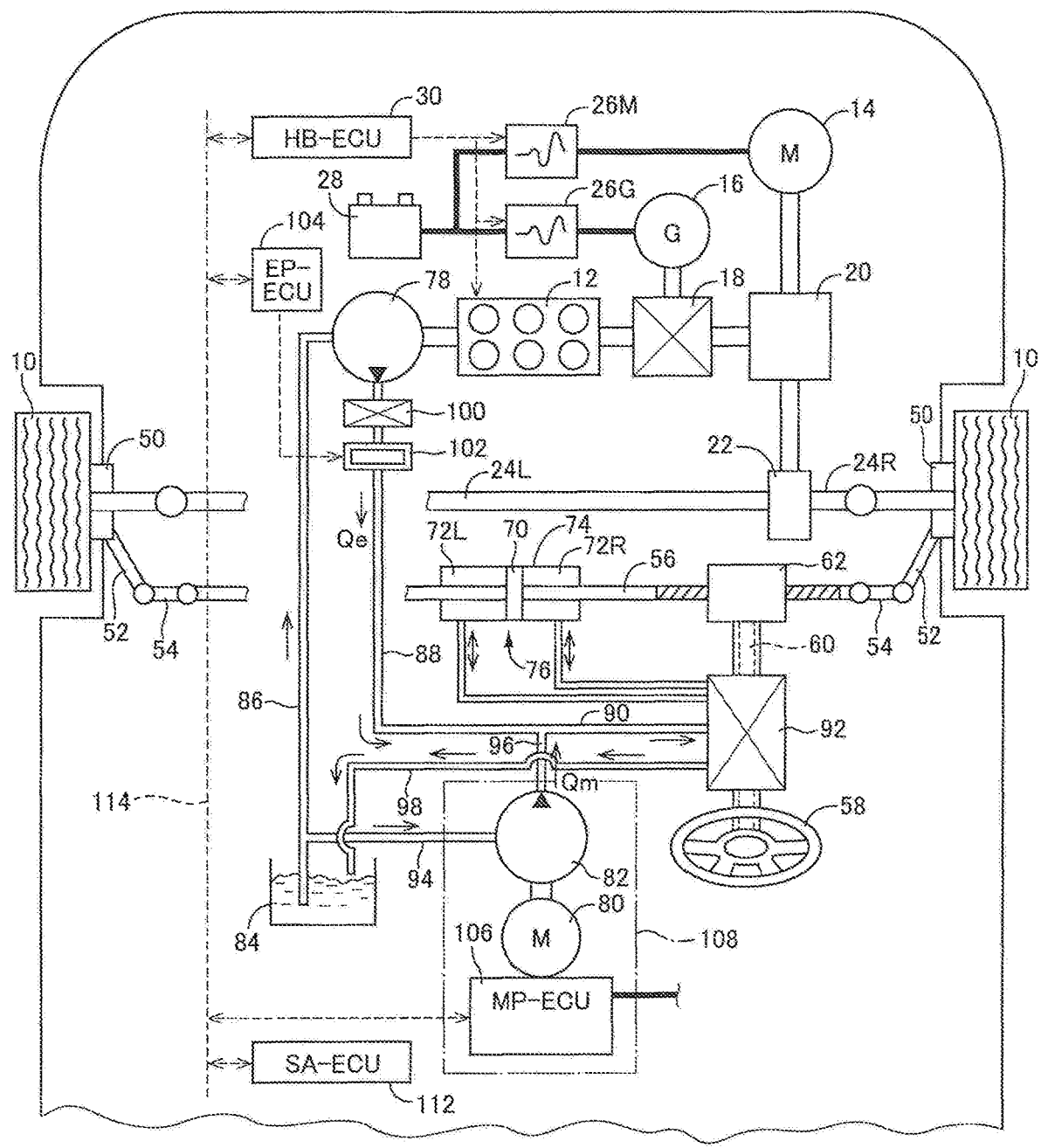
FIG. 1 is a view schematically illustrating an overall structure of a steering assist system according to one embodiment and a vehicle on which the steering assist system is installed.

As shown in FIG. 1, a vehicle on which a steering assist system according to the present embodiment is installed has four wheels 10, namely, front right and left wheels and rear right and left wheels. In FIG. 1, the two rear wheels are not illustrated. The two front wheels 10 are drive wheels. The vehicle is a hybrid vehicle whose front wheels 10 can be driven by both of an engine 12 and a drive motor 14 as an electric motor. The front wheels 10 are steerable wheels. In the following description, the steering assist system will be simply referred to as "assist system" where appropriate.

A vehicle drive system will be first explained. The vehicle drive system includes the engine 12, the drive motor 14, a generator 16 that functions mainly as an electric generator, and a power-distribution mechanism 18 to which the engine 12 and the generator 16 are coupled. The power-distribution mechanism 18 has a function of distributing rotation of the engine 12 to rotation of the generator 16 and rotation of an output shaft. The drive motor 14 is coupled to the output shaft via a reduction mechanism 20 functioning as a speed reducer. The rotation of the output shaft is transmitted to the front right and left wheels 10 via a differential mechanism 22 and respective drive shafts 24L, 24R, so that the front right and left wheels 10 are drivingly rotated. The generator 16 is coupled to a battery 28 via an inverter 26G. Electric energy obtained by electric power generation of the generator 16 is stored in the battery 28. The drive motor 14 is coupled to the battery 28 via an inverter 26M. The drive motor 14 and the generator 16 are controlled by controlling the inverter 26M and the inverter 26G, respectively. The vehicle drive system is controlled by an electronic control unit for hybrid driving (hereinafter abbreviated as "HB-ECU" where appropriate) 30. Depending upon the conditions, the HB-ECU 30 selectively establishes, as a running mode of the vehicle, one of an engine mode in which the vehicle is driven only by the engine 12, an EV mode in which the vehicle is driven only by the drive motor 14, and a hybrid mode in which the vehicle is driven by both of the engine 12 and the drive motor 14. The EV mode means a mode in which the vehicle is placed in the motor-driven state.

The vehicle steering system will now be explained. The vehicle steering system includes: a pair of steering knuckles (hereinafter each simply referred to as "knuckle" where appropriate) 50 respectively holding the front right and left wheels 10; a steering rod 56 extending in the right-left direction and connected at opposite ends thereof to knuckle arms 52 of the respective knuckles 50 via respective tie rods 54; a steering wheel 58 as a steering operation member; a steering shaft 60 held by a steering column and configured to rotate by a rotational operation of the steering wheel 58; and a gear box 62 that incorporates a motion converting mechanism (rack and pinion mechanism) for converting the rotation of the steering shaft 60 into a movement of the steering rod 56 in the right-left direction. The front right and left wheels 10 are steered by the rotational operation of the steering wheel 58.

[B] Hardware Structure of Steering Assist System

The assist system according to the present embodiment is for assisting a steering force by which a driver steers the front wheels 10 owing to a pressure of the working fluid (working oil). The assist system includes a hydraulic actuator 76 including a piston 70 fixed to the steering rod 56 and a housing 74 whose interior is partitioned into two fluid chambers 72L, 72R by the piston 70. The assist system further includes two pumps, each as a high-pressure fluid source, i.e., an engine pump 78 configured to be driven by the engine 12 and a motor pump 82 configured to be driven by an electric motor 80. The engine pump 78 pumps up the working fluid out of a reservoir 84 storing the working fluid via a first pump-up passage 86 and ejects the pumped working fluid to a supply-flow controlling mechanism 92 (which will be described) via a first ejection passage 88 and a common ejection passage 90. The motor pump 82 pumps up the working fluid out of the reservoir 84 via a second pump-up passage 94 and ejects the pumped working fluid to the supply-flow controlling mechanism 92 via a second ejection passage 96 and the common ejection passage 90.

Figure 2:
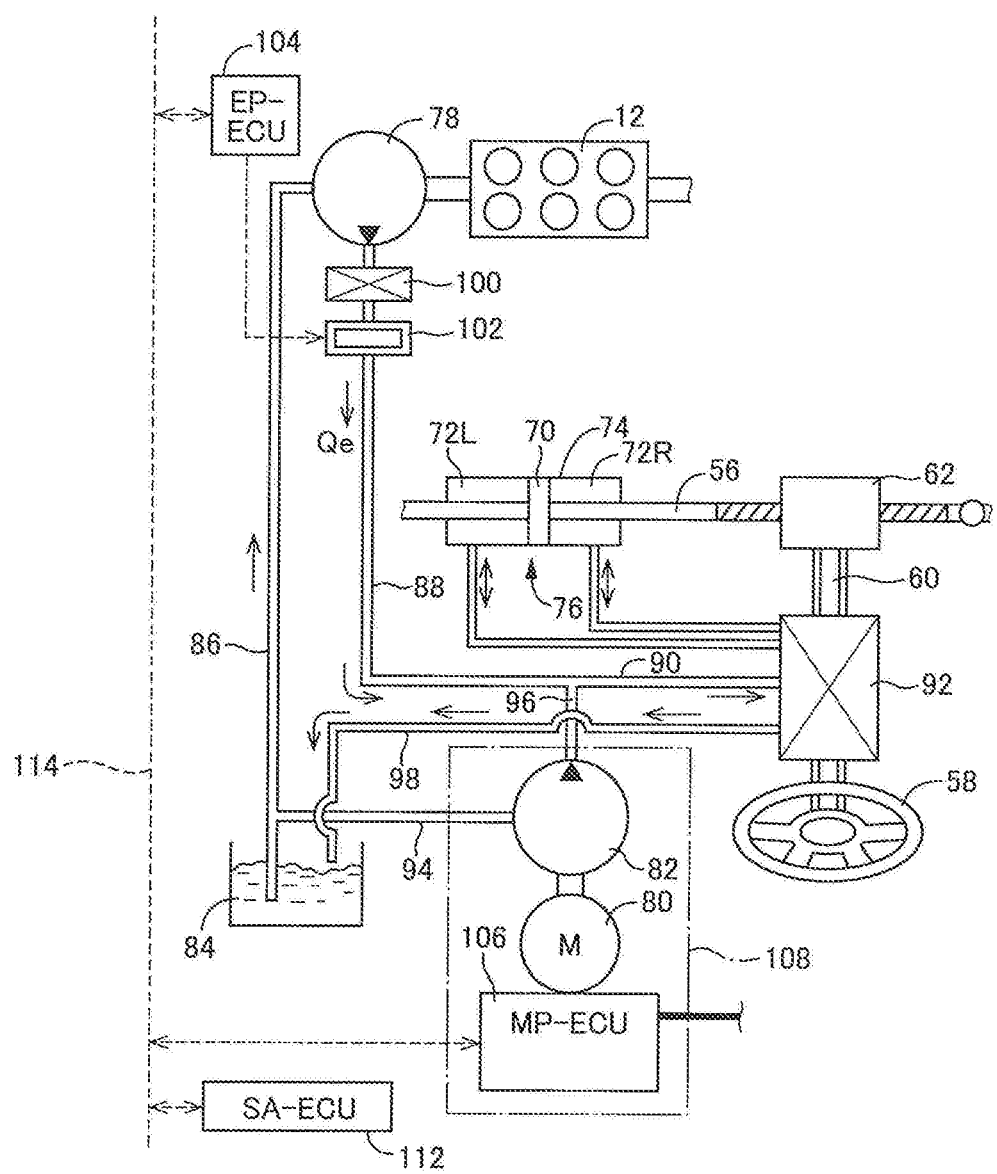
FIG. 2 is a view illustrating a state of the steering assist system in which a working fluid is ejected to an assist device only from an engine pump.

The supply-flow controlling mechanism 92 has a known ordinary structure as illustrated in FIG. 2 of the Japanese Patent Application Publication No. 6-8840, for instance. Specifically, the supply-flow controlling mechanism 92 has a function of controlling the flow rate of the working fluid to be supplied to the actuator 76 and a function of determining to which one of the two fluid chambers 72L, 72R the working fluid is to be supplied, based on a twisted amount of a torsion bar in accordance with the steering force by the driver and a steering direction, for instance. The supply-flow controlling mechanism 92 is configured to receive the working fluid ejected from at least one of the engine pump 78 and the motor pump 82. When the steering force is not being generated, the supply-flow controlling mechanism 92 permits the received working fluid to return to the reservoir 84 via a return passage 98. That is, the working fluid is circulated. When the steering force is being generated, on the other hand, the supply-flow controlling mechanism 92 supplies at least a part of the received working fluid to one of the two fluid chambers 72L, 72R of the actuator 76 at a flow rate in accordance with the steering and receives, from the other of the two fluid chambers 72L, 72R, the working fluid at the same flow late as the supplied working fluid. The supply-flow controlling mechanism 92 permits the working fluid received from the other of the two fluid chambers 72L, 72R also to return to the reservoir 84. In the actuator 76, a force in accordance with the pressure of the working fluid supplied from the supply-flow controlling mechanism 92 to the one of the two fluid chambers 72L, 72R acts on the piston 70, so that the steering force is assisted by the force, i.e., an assist force. In the present assist system, the supply-flow controlling mechanism 92 and the actuator 76 constitute an assist device configured to assist the steering force by the received working fluid while permitting the received working fluid to return to the reservoir 84.

The engine pump 78 is configured to eject the working fluid at a flow rate in accordance with a rotational speed of the engine 12. The assist system is provided with a flow-rate restricting mechanism 100 disposed on an ejection side of the engine pump 78 for restricting the flow rate of the working fluid ejected from the engine pump 78. The flow-rate restricting mechanism 100 has a known ordinary structure including valves, as described in the Japanese Patent No. 3218788, Japanese Patent Application Publication No. 8-301132, or the Japanese Patent Application Publication No. 6-8840, for instance. Specifically, the flow-rate restricting mechanism 100 has a function of restricting, to a set flow rate, the flow rate of the working fluid to be supplied to the supply-flow controlling mechanism 92 after passing therethrough, in the case where the rotational speed of the engine 12 becomes high to a certain extent. Further, the assist system is provided with an engine-pump ejection flow rate controlling mechanism 102 disposed on an ejection side of the flow-rate restricting mechanism 100 so as to be in series therewith and configured to control the flow rate of the working fluid to be sent from the flow-rate restricting mechanism 100 to the supply-flow controlling mechanism 92. The engine-pump ejection flow rate controlling mechanism 102 has a known ordinary electromagnetic valve structure as illustrated in FIG. 2 of the Japanese Patent Application Publication No. 2014-19290, for instance. The engine-pump ejection flow rate controlling mechanism 102 has a function of allowing passage of the working fluid at a flow rate in accordance with an electric current supplied to a solenoid. The engine-pump ejection flow rate controlling mechanism 102 is controlled by an electronic control unit for the engine-pump ejection flow rate (hereinafter referred to as "EP-ECU" where appropriate) 104. It may be considered that the engine-pump ejection flow rate controlling mechanism 102 and the EP-ECU 104 constitute an engine-pump ejection flow rate controller. The flow rate of the working fluid ejected from the engine pump 78 to the supply-flow controlling mechanism 92 will be hereinafter referred to as an engine-pump ejection flow rate Qe. The engine-pump ejection flow rate controller has a function of electronically controlling the engine-pump ejection flow rate Qe.

Control of the motor pump 82, specifically, control of the operation of the electric motor 80 that drives the motor pump 82, is executed by an electronic control unit for the motor pump (hereinafter referred to as "MP-ECU" where appropriate) 106, as a motor-pump ejection flow rate controller. The flow rate of the working fluid ejected from the motor pump 82 to the supply-flow controlling mechanism 92 will be hereinafter referred to as a motor-pump ejection flow rate Qm. The MP-ECU 106 has a function of electronically controlling the motor-pump ejection flow rate Qm. The motor pump 82, the electric motor 80, and the MP-ECU 106 are formed as a unit and installed on the vehicle as a motor pump unit 108, thus enhancing installation efficiency of the motor pump 82, the electric motor 80, and the MP-ECU 106.

Control of the assist system is executed mainly by a steering-assist electronic control unit (hereinafter referred to as "SA-ECU" where appropriate) 112 including a computer as a main constituent element. The SA-ECU 112 functions as a central controller for controlling the EP-ECU 104 and the MP-ECU 106 in a centralized manner. The EP-ECU 104, the MP-ECU 106, the SA-ECU 112, and the HB-ECU 30 are connected to a car area network or controllable area network (CAN) 114 and configured to execute a cooperative control process while performing communication with one another.

In the assist system explained above, a first assist portion configured to assist the steering force utilizing the engine 12 as a drive source is constituted by the actuator 76, the engine pump 78, the reservoir 84, the supply-flow controlling mechanism 92, the flow-rate restricting mechanism 100, the engine-pump ejection flow rate controlling mechanism 102, and the EP-ECU 104. Further, a second assist portion configured to assist the steering force utilizing the electric motor 80 as a drive source is constituted by the actuator 76, the electric motor 80, the motor pump 82, the reservoir 84, the supply-flow controlling mechanism 92, and the MP-ECU 106.

[C] Operation of Steering Assist System
i) Operation in Normal Condition

Figure 3:
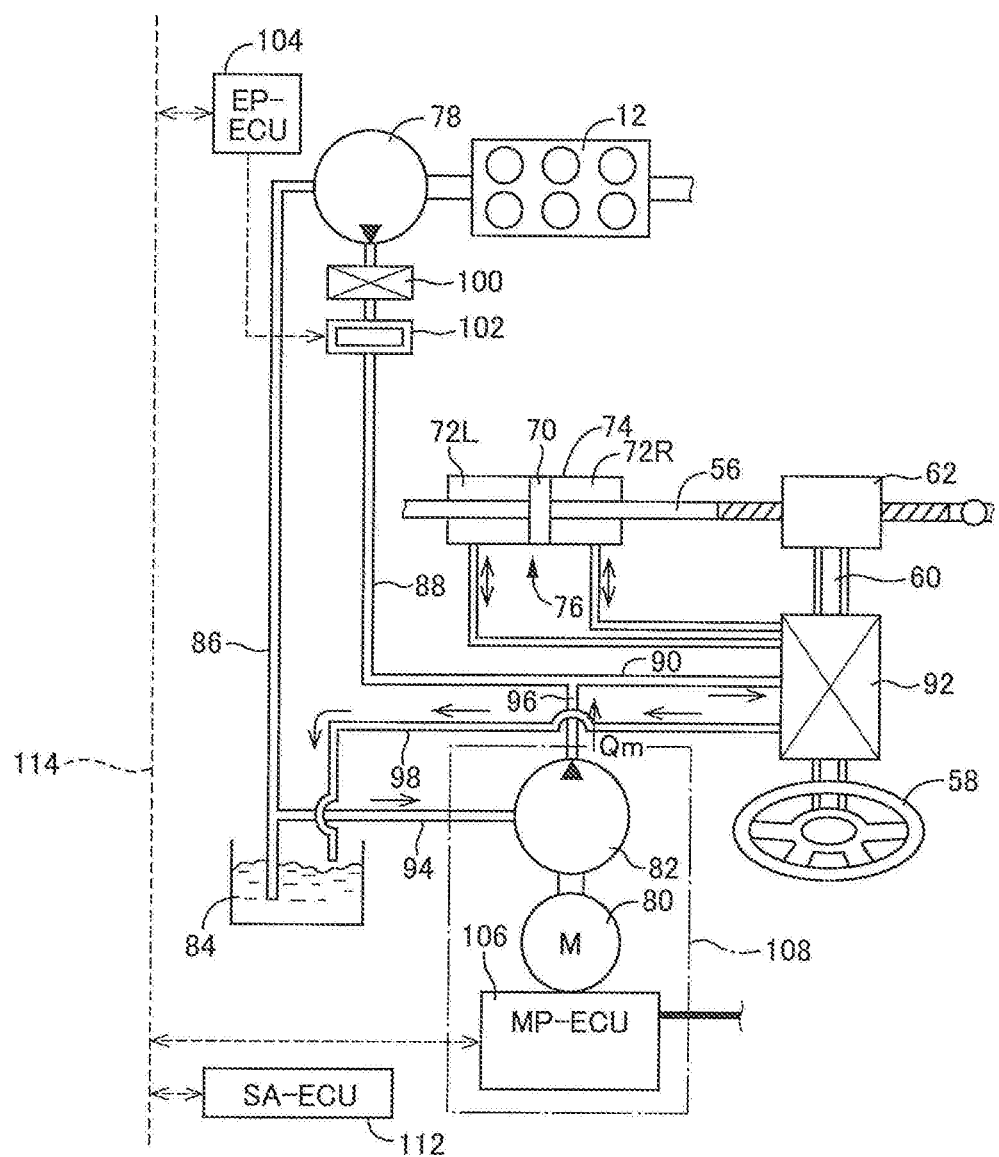
FIG. 3 is a view illustrating a state of the steering assist system in which the working fluid is ejected to the assist device only from the motor pump.

FIG. 1 shows a state of the assist system in which the working fluid is ejected to the supply-flow controlling mechanism 92 from both of the engine pump 78 and the motor pump 82. An operation mode of the assist system in this state will be hereinafter referred to as a bi-pump mode. FIGS. 2 and 3, in each of which only the assist system is illustrated, respectively show a state in which the working fluid is ejected to the supply-flow controlling mechanism 92 only from the engine pump 78 and a state in which the working fluid is ejected to the supply-flow controlling mechanism 92 only from the motor pump 82. The operation mode shown in the state of FIG. 2 will be hereinafter referred to as an engine-pump mode, and the operation mode shown in the state of FIG. 3 will be hereinafter referred to as a motor-pump mode.

Figure 4A:
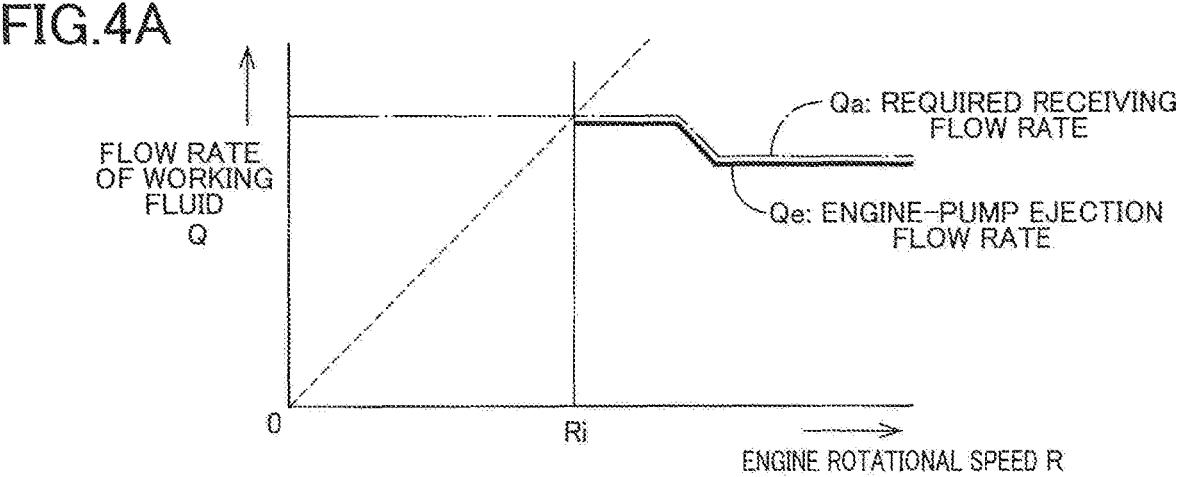
FIG. 4A is a graph for explaining an operation of the steering assist system in a normal condition.

There will be explained an operation executed in the engine-pump mode. As indicated by the dashed line in a graph of FIG. 4A, the ejection flow rate of the working fluid ejected from the engine pump 78 substantially linearly increases with an increase in a rotational speed R of the engine 12. In the interest of simplification of explanation, a case is considered in which the engine-pump ejection flow rate controlling mechanism 102 is not operated, namely, the engine-pump ejection flow rate Qe is restricted only by the flow-rate restricting mechanism 100. For instance, the flow-rate restricting mechanism 100 may be adjusted such that the engine-pump ejection flow rate Qe is restricted as indicated by the long dashed short dashed line in the graph of FIG. 4A. The flow rate of the working fluid which is required to be received by the supply-flow controlling mechanism 92, i.e., a required receiving flow rate Qa, is set in the present assist system. The graph of FIG. 4A shows an instance in which the flow-rate restricting mechanism 100 is adjusted such that the engine-pump ejection flow rate Qe is equal to the required receiving flow rate Qa. That is, the long dashed short dashed line in the graph may be regarded as a line indicating the required receiving flow rate Qa. It is noted that the required receiving flow rate Qa becomes smaller when the rotational speed R of the engine 12 is increased to a certain extent. This is because for increasing a load with respect to the steering operation, namely, for increasing a force required for the steering operation, in order to improve a steering feeling as felt by the driver, when the vehicle is running at a relatively high speed to a certain extent. According to the thus constructed engine pump 78 and flow-rate restricting mechanism 100, the working fluid is ejected to the supply-flow controlling mechanism 92 at the engine-pump ejection flow rate Qe indicated by the solid line. The engine 12 is rotated at a speed higher than or equal to the set idling speed Ri. Thus, there is no solid line, in the graph, that indicates the engine-pump ejection flow rate Qe in a region of the engine rotational speed lower than the idling speed Ri.

Figure 4B:
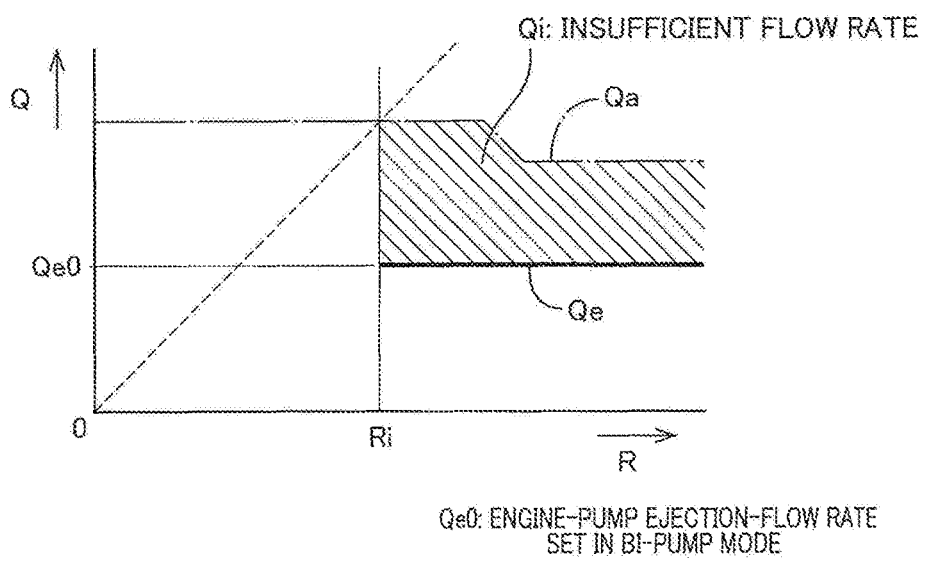
FIG. 4B is a graph for explaining an operation of the steering assist system in a normal condition.

In the present assist system, the engine-pump ejection flow rate controlling mechanism 102 is also operated by being controlled by the EP-ECU 104, so that the engine-pump ejection flow rate Qe is further restricted. Specifically, the engine-pump ejection flow rate Qe is made low so as to be equal to an engine-pump ejection-flow rate Qe0 set in the bi-pump mode, as indicated by the solid line in a graph of FIG. 4B. Thus, an insufficient flow rate Qi(Qa−Qe0), which is a shortage in the required receiving flow rate Qa that cannot be covered by engine-pump ejection flow rate Qe, is caused over an entire region of the rotational speed R in which the engine 12 operates. Over the entire region, the assist system operates in the bi-pump mode, and the insufficient flow rate Qi is covered by the motor-pump ejection flow rate Qm.

When the running mode of the vehicle is the EV mode, the engine 12 is not operating. In this case, the assist system operates in the motor-pump mode, and the motor pump 82 is controlled by the MP-ECU 106 such that the entirety of the required receiving flow rate Qa is covered by the motor-pump ejection flow rate Qm.

ii) Failure of Second Assist Portion and Measures for Addressing Failure

In the case where the electric motor 80, the motor pump 82, or the MP-ECU 106 fails to operate, namely, in the case where the second assist portion, as a portion for assisting the steering force utilizing the electric motor 80 as a drive source, fails to fulfill the assist function, the motor-pump ejection flow rate Qm cannot be obtained. In the interest of simplification of the explanation, such a failure will be hereinafter referred to as a failure of the second assist portion. In the case where the second assist portion suffers from the failure, the present assist system executes assist switching from the assist by the second assist portion to the assist by the first assist portion, namely, to the assist that depends on the working fluid ejected from the engine pump 78. Thus, in the case where the second assist portion fails to operate, the engine 12 is started and the vehicle is prohibited from running in the EV mode. In the engine-pump mode, the entirety of the required receiving flow rate Qa is covered by the engine-pump ejection flow rate Qe, and the EP-ECU 104 controls the engine-pump ejection flow rate controlling mechanism 102 not to operate.

In the case where the failure of the second assist portion occurs in a state in which the vehicle is running in the EV mode, however, care should be taken in executing the assist switching from the assist by the second assist portion to the assist by the first assist portion, as explained below in detail. As shown in a time chart of FIG. 5, the assist system operates in the motor-pump mode when the running mode of the vehicle is the EV mode, and the motor pump 82 ejects the working fluid at the motor-pump ejection flow rate Qm that satisfies the required receiving flow rate Qa as a set flow rate. When the driver operates the steering wheel 58 and the wheels 10 are accordingly being steered, namely, when the driver is performing the steering operation, a steering torque Tq, which is the operation force of the steering wheel 58, is given to the steering wheel 58 by the driver, as shown in the time chart of FIG. 5. Because the steering force is assisted by the assist system, the steering torque Tq is a relatively small value, Tq0, and a steering angle θ as a steering amount of the wheels 10 is kept equal to θ0 under the steering torque Tq0, as shown in the time chart of FIG. 5.

When the second assist portion fails to operate at a time point t1, namely, when there occurs a failure of the electric motor 80, a failure of the MP-ECU 106, or an electric failure such as a cutoff of an electric power supply to the electric motor 80, the motor-pump ejection flow rate Qm is lowered to 0, so that the assist force to assist the steering cannot be obtained. In this instance, the driver tries to maintain the steering angle θ0 and increases the steering torque Tq up to Tq1.

Figure 5:
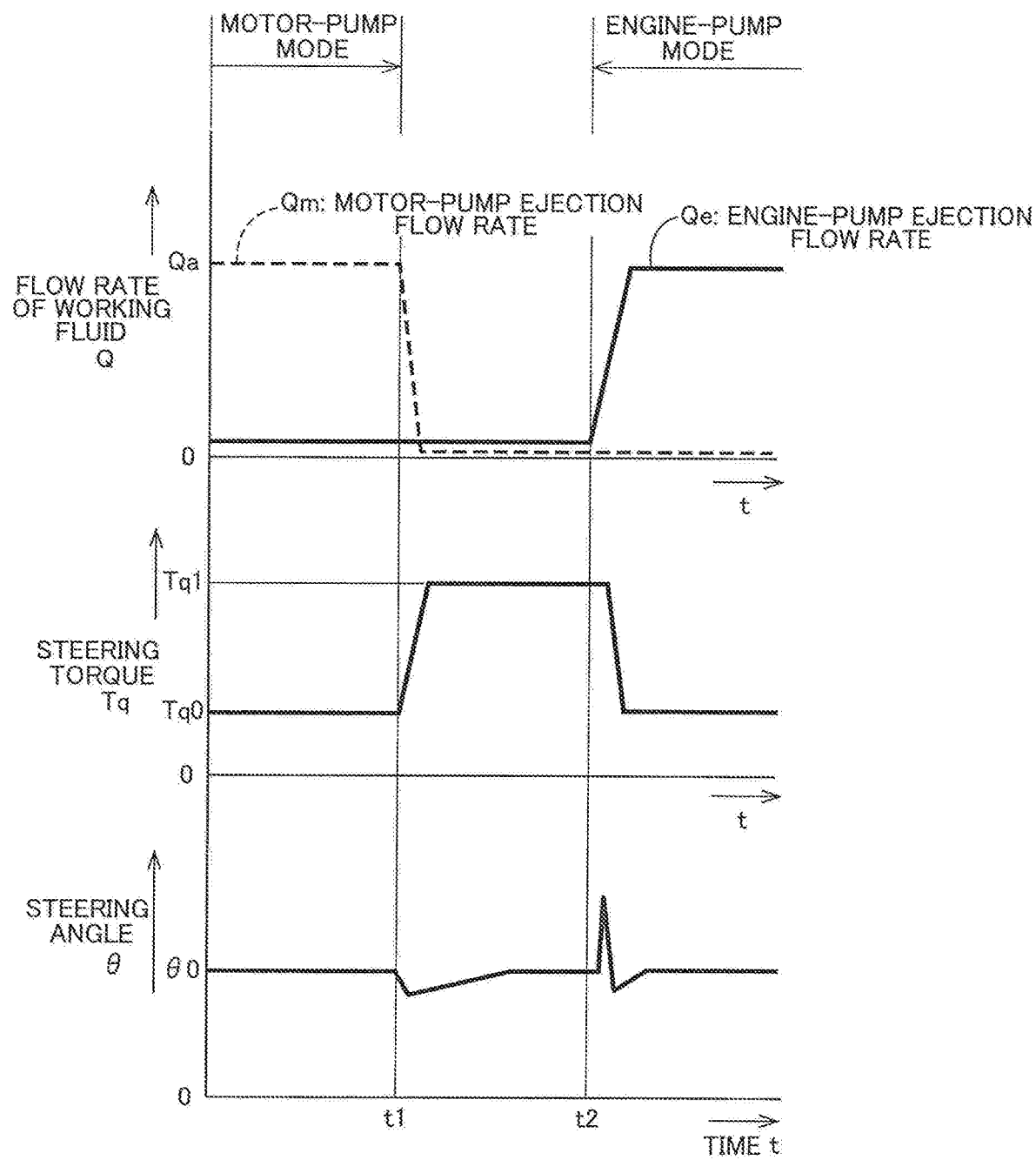
FIG. 5 is a time chart indicating changes in a flow rate of the working fluid, a steering torque, and a steering angle caused when switching to an assist by a first assist portion according to a known technique when a failure of a second assist portion occurs in running of the vehicle in an EV mode.

According to a conventionally employed technique, the operation mode of the assist system is switched from the motor-pump mode to the engine-pump mode at a time point t2, and the working fluid is abruptly ejected from the engine pump 78 at the engine-pump ejection flow rate Qe that satisfies the required receiving flow rate Qa, as shown in the time chart of FIG. 5. Such abrupt ejection of the working fluid from the engine pump 78 causes the assist force to be suddenly generated again. In this case, there may be caused a delay in adjustment of the steering torque Tq by the driver with respect to the change in the steering force, so that the steering angle θ may largely vary.

Figure 6:
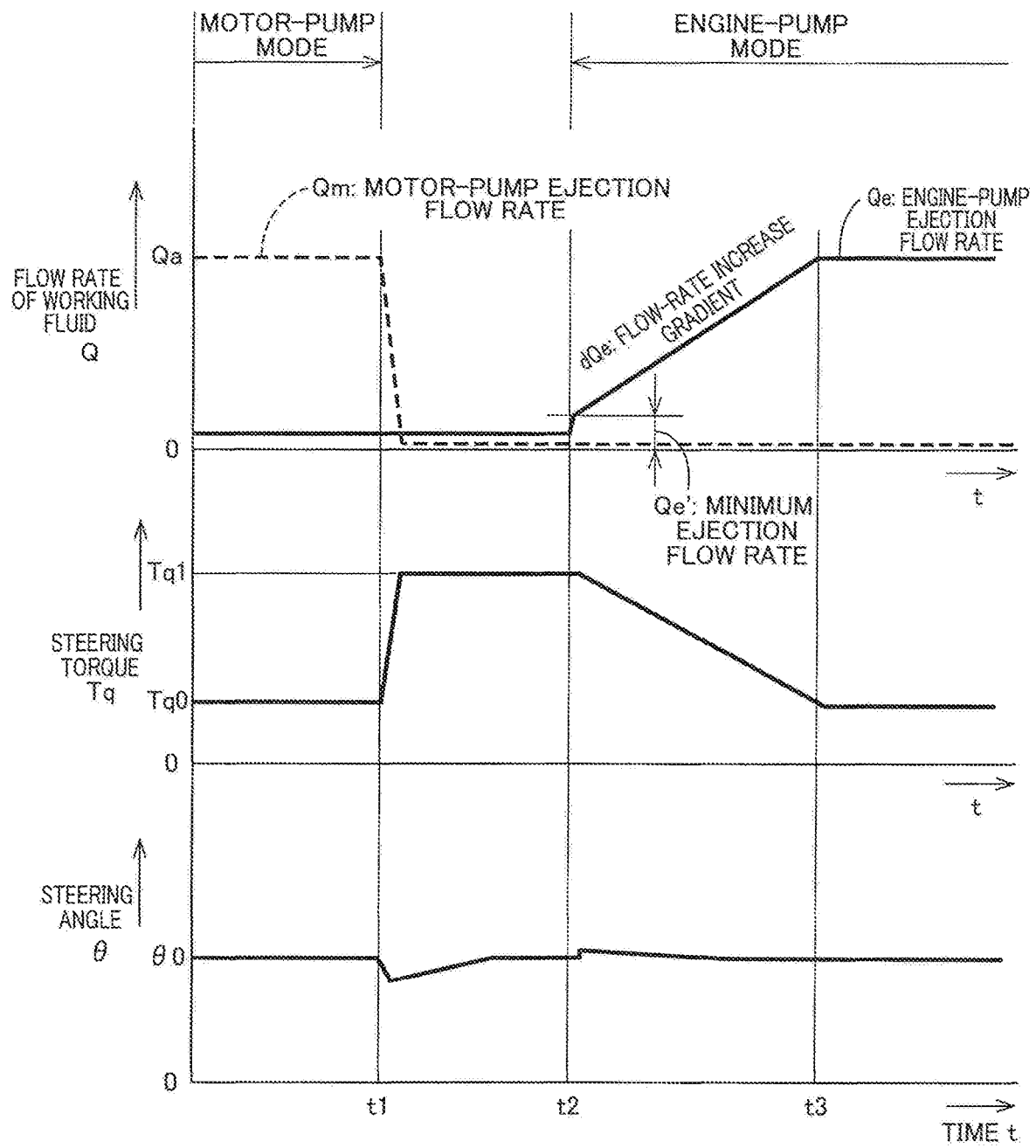
FIG. 6 is a time chart indicating changes in the flow rate of the working fluid, the steering torque, and the steering angle caused when switching to the assist by the first assist portion according to a technique employed in the present steering assist system when the failure of the second assist portion occurs in running of the vehicle in the EV mode.

The present assist system deals with the change in the steering force in the following manner. As shown in a time chart of FIG. 6, in the case where the engine-pump mode is established at a time point t2, the engine-pump ejection flow rate Qe is gradually increased, in a time period from the time point t2 to a time point t3, from a minimum ejection flow rate Qe', which is the engine-pump ejection flow rate Qe at the time of startup of the engine pump 78, up to the required receiving flow rate Qa as the set flow rate, in order to gradually increase the assist force up to the set assist force, namely, up to the assist force that has been generated in the motor-pump mode. The gradual increase of the engine-pump ejection flow rate Qe is executed by controlling the engine-pump ejection flow rate controlling mechanism 102 by the EP-ECU 104. The control of the engine-pump ejection flow rate controlling mechanism 102 by the EP-ECU 104 is ended at a time point when the engine-pump ejection flow rate Qe becomes equal to the required receiving flow rate Qa, and the engine-pump ejection flow rate controlling mechanism 102 is thereafter in a non-operating state, namely, in a state in which the engine-pump ejection flow rate controlling mechanism 102 allows the working fluid from the flow-rate restricting mechanism 100 to freely pass through the engine-pump ejection flow rate controlling mechanism 102 without any restriction. In this respect, a change gradient in the gradual increase of the engine-pump ejection flow rate Qe, i.e., a flow-rate increase gradient dQe, is made constant. That is, the engine-pump ejection flow rate Qe is increased linearly with a lapse of time.

The gradual increase of the assist force, namely, the gradual increase of the assist capability, enables the driver to easily respond to the switching from the motor-pump mode to the engine-pump mode, and the steering angle θ is stably maintained in the switching to the engine-pump mode. It is noted that the time period between the time point t2 and the time point t3 is not limited to a particular time period but may be suitably set so as not to disturb the behavior of the vehicle.

Even if the second assist portion fails to operate in the EV mode, the gradual increase of the engine-pump ejection flow rate Qe is not executed if the vehicle is not being steered, namely, if the driver is not performing the steering operation, at the time of occurrence of the failure. In this instance, the engine-pump ejection flow rate Qe is made equal to the required receiving flow rate Qa from the time the time point t2.

[D] Control Flow of Steering Assist System

Figure 7:
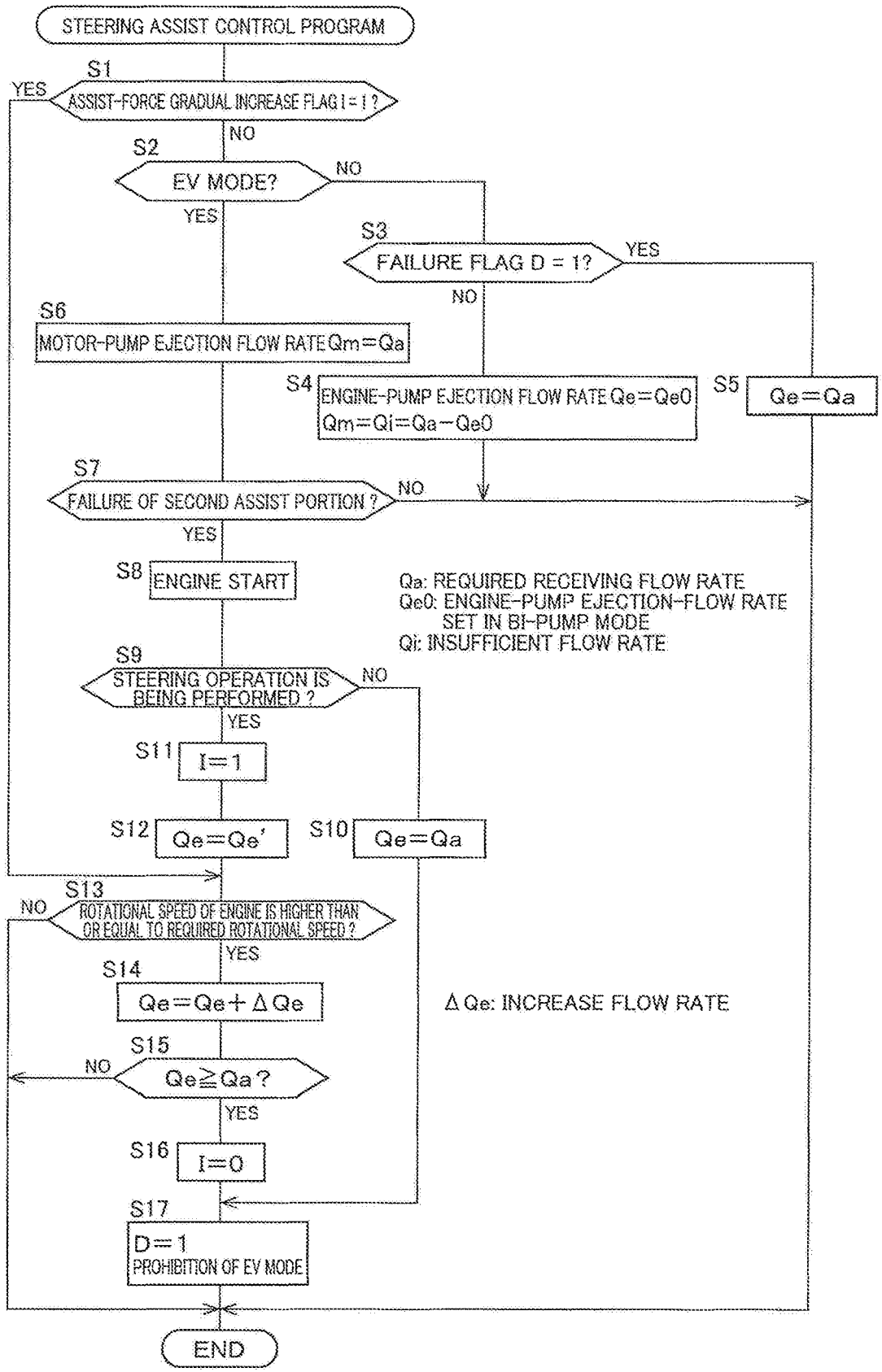
FIG. 7 is a flowchart indicating a steering assist control program executed in the steering assist system.

The control of the assist system, which includes measures to address the failure of the second assist portion in the EV mode, is executed such that the SA-ECU 112 repeatedly executes a steering assist control program indicated by a flowchart of FIG. 7 at a short time pitch, e.g., from several to several tens of milliseconds (msec). There will be hereinafter explained a control flow of the assist system by explaining a process according to the control program. In this respect, at least a part of the steering assist control program may be executed by at least one of the HB-ECU 30, the EP-ECU 104, and the MP-ECU 106, instead of the SA-ECU 112.

In the process according to the control program, Step 1 is implemented to confirm a flag value of an assist-force gradual increase flag I. (Hereinafter, Step 1 is abbreviated as "S1". Other steps are similarly abbreviated.) The flag value of the assist-force gradual increase flag I is "1" in the case where a process for gradually increasing the engine-pump ejection flow rate Qe is being executed. An initial value of the assist-force gradual increase flag I is "0". The process for gradually increasing the engine-pump ejection flow rate Qe will be hereinafter referred to as "gradual-increase process" where appropriate.

In the case where the gradual-increase process is not being executed, it is determined at S2 whether or not the running mode of the vehicle is the EV mode. When the running mode of the vehicle is not the EV mode, S3 is implemented to confirm a flag value of a failure flag D. The flag value of the failure flag D is "1" in the case where the second assist portion utilizing the electric motor 80 as the drive source is in failure. An initial value of the failure flag D is "0". When the second assist portion is not in failure, S4 is implemented at which the EP-ECU 104 controls the engine-pump ejection flow rate controlling mechanism 102 such that the engine-pump ejection flow rate Qe becomes equal to the engine-pump ejection-flow rate Qe0 set in the bi-pump mode and the MP-ECU 106 controls the electric motor 80 such that the motor-pump ejection flow rate Qm becomes equal to the insufficient flow rate Qi(Qa−Qe0). On the other hand, when the second assist portion is in failure, S5 is implemented not to operate the engine-pump ejection flow rate controlling mechanism 102, so that the engine-pump ejection flow rate Qe is made equal to the required receiving flow rate Qa.

When it is determined at S2 that the running mode of the vehicle is the EV mode, S6 is implemented at which the MP-ECU 106 controls the electric motor 80 such that the motor-pump ejection flow rate Qm becomes equal to the required receiving flow rate Qa. At S7, it is determined whether the failure of the second assist portion occurs in current execution of the control program. This determination is made based on a failure-occurrence signal sent from the MP-ECU 106, no response of the MP-ECU 106, or the like. When it is determined that the failure occurs, a command to start the engine 12 is sent to the HB-ECU 30 at S8. At S9, it is determined whether or not the steering operation is, being performed, namely, whether or not the vehicle is being steered. When the steering operation is not being performed, the engine-pump ejection flow rate Qe is made equal to the required receiving flow rate Qa at S10, as at S5. When the steering operation is being performed, the flag value of the assist-force gradual increase flag I is set to "1" at S11, and the engine-pump ejection flow rate Qe is set to the minimum ejection flow rate Qe' at S12. At S13, it is determined whether or not the rotational speed of the engine 12 is higher than or equal to a required rotational speed, in other words, higher than or equal to the rotational speed at which the minimum ejection flow rate Qe' is obtained. When the rotational speed of the engine 12 is higher than or equal to the required rotational speed, S14 is implemented at which a command to increase the engine-pump ejection flow rate Qe by an increase flow rate ΔQe is sent to the EP-ECU 104. When the rotational speed of the engine 12 is lower than the required rotational speed, S14 and subsequent steps are skipped.

In a time period during which the flag value of the assist-force gradual increase flag I is "1", the engine-pump ejection flow rate Qe is increased by the increase flow rate ΔQe every time the control program is executed, whereby the assist force, i.e., the assist capability, is gradually and linearly increased. When it is determined at S15 that the engine-pump ejection flow rate Qe reaches the required receiving flow rate Qa, S16 is implemented to reset the flag value of the assist-force gradual increase flag I to "0" so as to stop execution of the gradual-increase process of the assist force. At S17, the flag value of the failure flag D is set to "1", and a command to prohibit the EV mode is sent to the HB-ECU 30. The process at S17 causes the required receiving flow rate Qa to be covered by the engine-pump ejection flow rate Qe in subsequent execution of the control program.

In the case where it is determined that the failure of the second assist portion occurs in modes other than the EV mode (though not explained in the process according to the control program described above), the engine-pump ejection flow rate Qe is made equal to the required receiving flow rate Qa and the EV mode is prohibited, as in the case where it is determined that the failure of the second assist portion occurs in the EV mode. In this respect, in the case where it is determined that the failure of the second assist portion occurs in the bi-pump mode, the engine-pump ejection flow rate Qe may be gradually increased from the engine-pump ejection-flow rate set in the bi-pump mode Qe0 up to the required receiving flow rate Qa.

What is claimed is:

1. A steering assist system for a hybrid vehicle configured to be capable of being driven by both of an engine and a drive motor, comprising:
    a first assist portion configured to assist a steering force utilizing the engine as a drive source, and
    a second assist portion configured to assist the steering force utilizing an electric motor as a drive source,
    wherein the steering force is assisted only by the second assist portion in a motor-driven state in which the vehicle is driven only by the drive motor, and
    wherein the steering assist system is configured to, when a failure of the second assist portion occurs in the motor-driven state, drive the engine, execute assist switching from an assist by the second assist portion to an assist by the first assist portion, and gradually increase at a constant rate, in the assist switching, an assist force generated by the first assist portion up to a set assist force in a case where the vehicle is being steered.

2. The steering assist system according to claim 1, wherein, in a case where the vehicle is not being steered, the assist force generated by the first assist portion is made equal to the set assist force from a time point of execution of the assist switching.

3. The steering assist system according to claim 1, wherein the set assist force is made equal to the assist force generated by the second assist portion before execution of the assist switching.

4. The steering assist system according to claim 1, further comprising:
    a reservoir storing a working fluid;
    an engine pump configured to be driven by the engine and to pump up the working fluid stored in the reservoir so as to eject the working fluid at a flow rate in accordance with a rotational speed of the engine;
    a motor pump configured to be driven by the electric motor and to pump up the working fluid stored in the reservoir so as to eject the working fluid; and
    an assist device configured to receive the working fluid ejected from the motor pump and the working fluid ejected from the engine pump and to assist the steering force by the received working fluid while returning the received working fluid to the reservoir,
    wherein the first assist portion is constituted by the reservoir, the engine pump, and the assist device, and the second assist portion is constituted by the reservoir, the electric motor, the motor pump, and the assist device.

5. The steering assist system according to claim 4, further comprising: an engine-pump ejection flow rate controller configured to control an engine-pump ejection flow rate which is a flow rate of the working fluid ejected from the engine pump; and a motor-pump ejection flow rate controller configured to control, by controlling an operation of the electric motor, a motor-pump ejection flow rate which is a flow rate of the working fluid ejected from the motor pump,
    wherein, in the assist switching executed when the vehicle is being steered, the engine-pump ejection flow rate controller gradually increases the engine-pump ejection flow rate up to a set flow rate such that the assist force is gradually increased.

6. The steering assist system according to claim 5, wherein the engine-pump ejection flow rate controller gradually increases the engine-pump ejection flow rate, in the assist switching executed when the vehicle is being steered, such that a flow-rate increase gradient is constant.

7. A steering assist system for a hybrid vehicle configured to be capable of being driven by both of an engine and a drive motor, comprising:
- a first assist portion configured to assist a steering force utilizing the engine as a drive source, and
- a second assist portion configured to assist the steering force utilizing an electric motor as a drive source;
- a reservoir storing a working fluid;
- an engine pump configured to be driven by the engine and to pump up the working fluid stored in the reservoir so as to eject the working fluid at a flow rate in accordance with a rotational speed of the engine;
- a motor pump configured to be driven by the electric motor and to pump up the working fluid stored in the reservoir so as to eject the working fluid; and
- an assist device configured to receive the working fluid ejected from the motor pump and the working fluid ejected from the engine pump and to assist the steering force by the received working fluid while returning the received working fluid to the reservoir,
- wherein the steering force is assisted only by the second assist portion in a motor-driven state in which the vehicle is driven only by the drive motor, and
- wherein the steering assist system is configured to, when a failure of the second assist portion occurs in the motor-driven state, drive the engine, execute assist switching from an assist by the second assist portion to an assist by the first assist portion, and gradually increase, in the assist switching, an assist force generated by the first assist portion up to a set assist force in a case where the vehicle is being steered,
- wherein the first assist portion is constituted by the reservoir, the engine pump, and the assist device, and the second assist portion is constituted by the reservoir, the electric motor, the motor pump, and the assist device.

8. The steering assist system according to claim 7, wherein, in a case where the vehicle is not being steered, the assist force generated by the first assist portion is made equal to the set assist force from a time point of execution of the assist switching.

9. The steering assist system according to claim 7, wherein the set assist force is made equal to the assist force generated by the second assist portion before execution of the assist switching.

10. The steering assist system according to claim 7, further comprising: an engine-pump ejection flow rate controller configured to control an engine-pump ejection flow rate which is a flow rate of the working fluid ejected from the engine pump; and a motor-pump ejection flow rate controller configured to control, by controlling an operation of the electric motor, a motor-pump ejection flow rate which is a flow rate of the working fluid ejected from the motor pump,
- wherein, in the assist switching executed when the vehicle is being steered, the engine-pump ejection flow rate controller gradually increases the engine-pump ejection flow rate up to a set flow rate such that the assist force is gradually increased.

11. The steering assist system according to claim 10, wherein the engine-pump ejection flow rate controller gradually increases the engine-pump ejection flow rate, in the assist switching executed when the vehicle is being steered, such that a flow-rate increase gradient is constant.

* * * * *